Aug. 12, 1958 G. A. LYON 2,847,253
WHEEL COVER
Filed Dec. 6, 1954
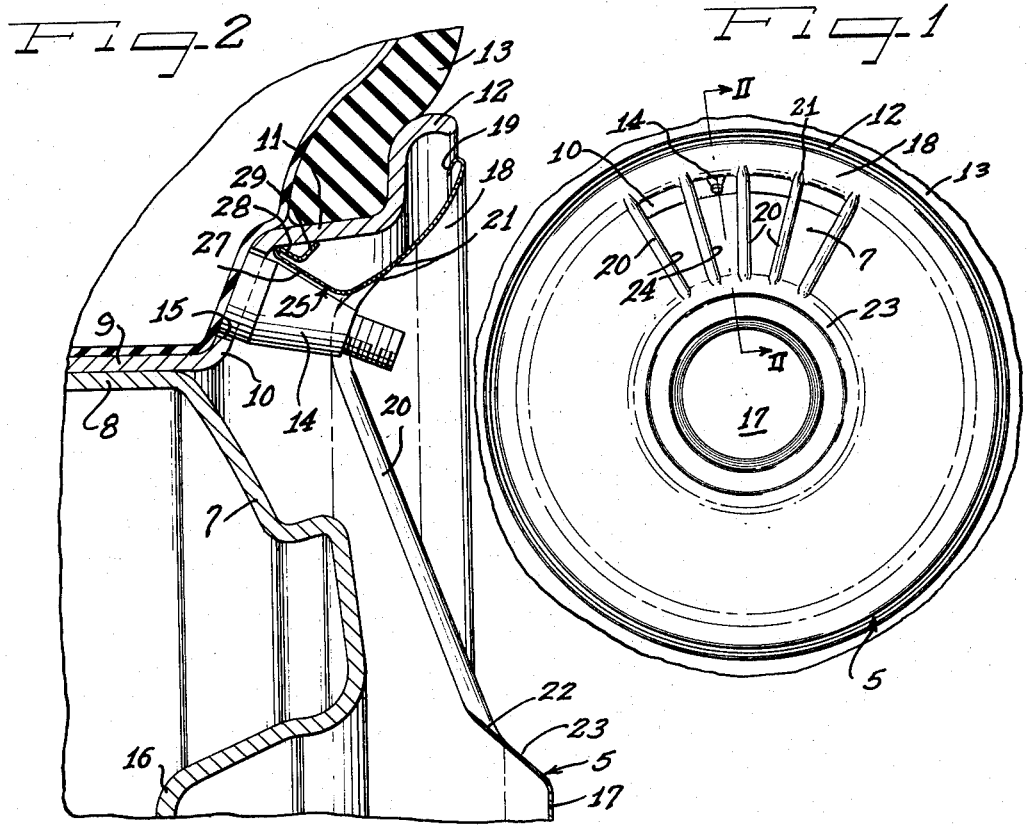
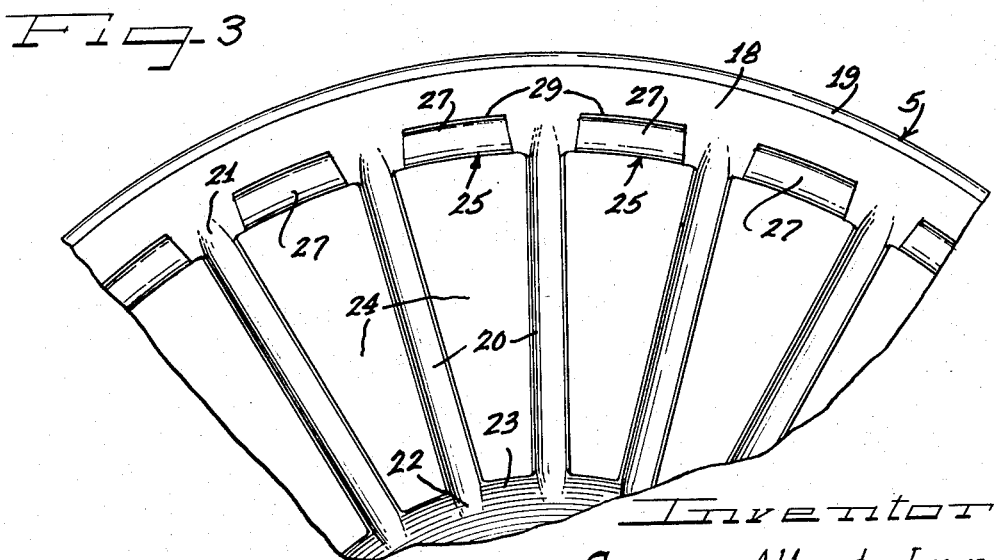
Inventor
George Albert Lyon United States Patent Office 2,847,253
Patented Aug. 12, 1958

2,847,253
WHEEL COVER

George Albert Lyon, Detroit, Mich.

Application December 6, 1954, Serial No. 473,201

2 Claims. (Cl. 301—37)

The present invention relates to improvements in wheel structures and more particularly concerns the ornamental and protective covering of the outer sides of vehicle wheels.

An important object of the present invention is to provide an improved wheel structure having novel ornamental and protective cover means for the outer side thereof.

Another object of the invention is to provide an improved wheel cover having novel cover-retaining and positioning means.

A further object of the invention is to provide a cover having self-retaining fingers thereon serving also as axial positioning stops.

Still another object of the invention is to provide an improved cover for disposition at the outer side of a vehicle wheel.

Other objects, features and advantages of the present invention will be readily apparent from the following detailed description of a preferred embodiment thereof taken in conjunction with the accompanying drawing in which:

Figure 1 is a side elevational view of a wheel structure embodying features of the invention;

Figure 2 is an enlarged fragmentary radial sectional view taken substantially on the line II—II of Figure 1; and Figure 3 is a fragmentary rear elevational view of the cover.

A wheel cover 5 according to the present invention is adapted to be applied to the outer side of a vehicle wheel including a disk spider wheel body 7 having an outer marginal axially inwardly directed attachment flange 8 secured in suitable manner to a base flange 9 of a tire rim. From the base flange extends a generally radially and axially outwardly sloping side flange 10 merging with a generally axially outwardly and slightly radially outwardly sloping intermediate flange 11 joining a generally radially outwardly and an axially outwardly directed terminal flange 12. The tire rim is adapted to support a pneumatic tire and tube assembly 13 or a tubeless tire. In any event, a valve stem 14 extends outwardly through a suitable aperture 15 in the side flange 10.

The cover 5 is constructed and arranged to overlie the tire rim and the wheel body in spaced, floating relation. To this end, the cover is preferably made from suitable gauge sheet metal such as stainless steel or brass plate which is readily stamped or drawn to form and is adapted to take a highly lustrous polish.

Centrally the cover 5 is provided with a crown portion 17 which is adapted to overlie the central portion of the wheel body 7 where the wheel body is provided with a generally inwardly dished bolt-on flange 16. A radially outer marginal annular cover portion 18 is of a diameter to substantially overlie the tire rim including the terminal flange 12 and has an underturned outer extremity reinforcing and finishing bead flange 19. From the bead 19 the outer annular cover portion 18 extends generally radially and axially inwardly and is joined integrally in one piece to the central cover portion 17 by a uniform series of rib-like spoke elements 20 which merge at their radially outer ends as at 21 with the inner margin of the annular cover portion 18 and then extend generally radially inwardly and axially outwardly to merge at their radially inner ends as at 22 with an oblique generally frustoconical axially inwardly and radially outwardly sloping side flange 23 of the cover crown portion 17. The spoke elements 20 are stamped in one piece with the other portions of the cover and are transversely arched in order to afford substantial rigidity. Intermediate the spoke elements 20 fairly large openings 24 are provided.

For retaining the cover on the wheel in predetermined axial disposition and in substantially floating relation, a uniform series of resilient retaining fingers 25 is provided. Each of the fingers 25 is an integral one piece extension from the inner margin of the radially outer annular cover portion 18 and is derived from material between the spoke elements 20 in forming the openings 24. Each of the fingers 25 includes an elongated generally axiallly inwardly and radially outwardly obliquely extending leg 27 extending to a diameter and a length whereby the leg will bottom against the tire rim at juncture of the side flange 10 with the intermediate flange 11, thereby supporting the cover in uniformly axially outwardly spaced relation to both the wheel body 7 and the tire rim.

At their inner ends, the fingers 25 are provided with return bent resilient finger portions 28 terminating in generally radially and axially outwardly directed angular retaining terminals 29 which are engageable under resilient tensioned endwise thrust against the intermediate flange 11. Normally the retaining finger terminals 29 extend to a slightly greater diameter than the diameter of at least the inner portion of the intermediate flange 11 so that in applying the cover and pressing the same axially inwardly, the retaining terminals 29 are placed under radially inward compression so that they will thrust with substantial tensioned force radially outwardly into retaining gripping engagement with the intermediate flange 11.

For prying the cover from the wheel, a pry-off tool is applied behind the outer turned edge 19 and pry-off leverage force applied, which causes the cover to be moved radially toward the opposite side of the wheel as permitted by the resilience of the retaining fingers 25 and the retaining finger terminals 29 nearest the point of pry-off force will slidably release their grip on the intermediate flange 11 and slide generally axially outwardly. This may have to be done at two or three points around the periphery of the cover to release adjacent ones of the series of retaining fingers.

It will be observed from Figure 3 that the retaining fingers 25 are of substantial width and are curved transversely parallel to the circumference of the cover so as to afford the fingers substantial resilient stiffness.

By having the fingers shoulder against the tire rim, to thus hold the cover in spaced relation to the wheel parts, relative tolerance axial variations in assembly of the wheel body 7 and the tire rim are immaterial with respect to assembly of the wheel cover since the cover touches neither of the parts and the retaining clips or fingers engage only one of the parts. Due to their resilience, the retaining fingers 25 are well capable of flexing with weaving movements or flexures of the tire rim in service operation of the vehicle, without displacement of the cover from the wheel.

It will be observed from Figures 1 and 2 that the valve stem 14 is readily accommodated through one of the openings 24 in the wheel cover between a pair of the spokes 20.

It will be understood that modifications and variations may be effected without departing from the scope of the novel concepts of the present invention.

I claim as my invention:

1. In a wheel structure including a tire rim and a wheel body, a cover for disposition over the outer side of the wheel comprising a one-piece sheet metal member including a central substantially rigid crown portion for overlying the central portion of the wheel body and a substantially rigid annular radially outer portion for overlying the tire rim and substantially spaced from said crown portion, said crown and radially outer annular portions being connected by substantially spaced narrow transversely arched rigid integral ribs merging on rigid junctures at their respectively inner and outer ends with respectively the crown and radially outer annular portions, and a series of cover retaining spring fingers derived from material from between said spokes and comprising extensions from the radially inner edge of said radially outer annular cover portion, said fingers having elongated generally radially outwardly and axially inwardly extending legs substantially concealed behind said outer annular cover portion and provided with return bent generally axially outwardly and radially inwardly angled terminal legs with retaining terminals angled radially and axially outwardly therefrom and engageable in resilient thrusting retaining gripping direct edgewise relation against a radially inwardly facing rim flange, one of the openings between said spokes accommodating a valve stem for access through the cover.

2. In a wheel structure including a tire rim having a side flange through which a valve stem is projectable in generally radially inwardly and axially outwardly oblique relation and an intermediate generally axially outwardly and radially outwardly oblique intermediate flange extends divergently relative to the valve stem so that there is a generally wedge shaped gap between the intermediate flange and the valve stem, a cover for disposition at the outer side of the wheel including radially inner and outer circular portions integrally connected by generally radially extending spoke elements, said radially outer cover portion being dimensioned to overlie the tire rim and having its inner edge on a diameter to lie close to the radially outer side of the valve stem spaced substantially from said side flange of the rim and with the valve stem projecting through and opening between a pair of the spoke elements, and a cover retaining resilient finger projecting as an integral extension from the inner edge of the outer cover member at the radially outer side of the opening through which the valve stem projects, said retaining finger having an elongated generally axially inwardly and radially outwardly oblique leg extending alongside and adjacent the radially outer side of the valve stem convergently toward the juncture of the side flange with the intermediate flange of the tire rim and having a turned terminal gripping portion for retaining engagement with the intermediate flange in said wedge shaped gap.

References Cited in the file of this patent

UNITED STATES PATENTS

| 2,193,104 | Lyon | Mar. 12, 1940 |
| 2,309,519 | Lyon | Jan. 26, 1943 |
| 2,368,228 | Lyon | Jan. 30, 1945 |
| 2,368,230 | Lyon | Jan. 30, 1945 |
| 2,368,238 | Lyon | Jan. 30, 1945 |
| 2,404,390 | Lyon | July 23, 1946 |
| 2,421,756 | Lyon | June 10, 1947 |
| 2,660,478 | Lyon | Nov. 24, 1953 |

FOREIGN PATENTS

| 449,040 | Great Britain | June 19, 1936 |